UNITED STATES PATENT OFFICE.

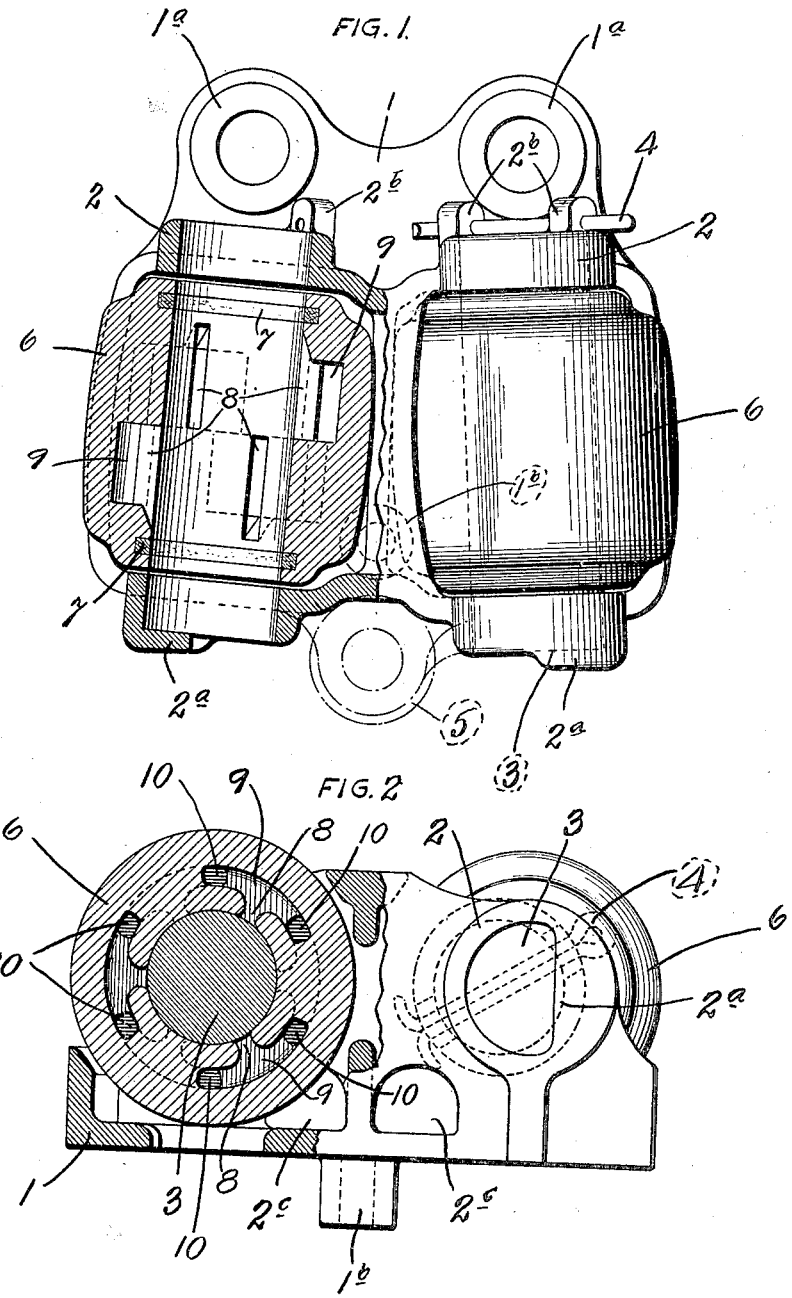

ERNEST A. LE BEAU, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SIDE BEARING FOR RAILWAY-CARS.

1,106,824.  Specification of Letters Patent.  Patented Aug. 11, 1914.

Application filed April 11, 1912. Serial No. 689,951.

*To all whom it may concern:*

Be it known that I, ERNEST A. LE BEAU, a citizen of the United States, residing at Chicago, Illinois, have invented a certain new and useful Improvement in Side Bearings for Railway-Cars, of which the following is a full, clear, and exact description, such as will enable others skilled in the art to which it appertains to make and use the same, reference being had to the accompanying drawings, forming part of this specification, in which—

Figure 1 is a top plan view of my improved side bearing for railway cars partly in horizontal section. Fig. 2 is a side elevation view of the same partly in vertical section.

This invention relates to a new and useful improvement in side bearing for railway cars, the object being to construct a bearing of the character described which will be simple, cheap and strong, and one which, by containing a lubricant, will be easy of operation.

In the drawings, 1 indicates the base from which extends bearing supports 2. One of these supports is preferably provided with an extension $2^a$ for forming an abutment for the axle 3, the opposite end of said axle being held in position by a cotter pin 4 passing through lugs $2^b$ on the opposite bearing support. The walls forming these bearing supports may be cut away at $2^c$ so as to permit the exit of dirt and dust.

The base 1 is provided with suitable bolt openings $1^a$ by which it may be attached to the bolster and is preferably provided with a downward extension or lug $1^b$ designed to fit in a recess in the bolster and to hold the base in position.

6 indicates the rollers of which there are preferably two in each bearing, although it is obvious that but one roller may be employed. This roller is in the form of a cylinder, preferably barrel shape in contour and open at each end. Near the ends of each cylinder are annular recesses in which a packing ring 7 is introduced to coöperate with the axle so as to make the interior of the roller bearing dust proof. Each roller is internally cored so as to form chambers between the axle and interior bearing surface and the outer bearing surface, said chambers forming a continuous lubricating receptacle.

Openings 8 which communicate with the axle bore connect with segmental chambers 9 of substantial length and width, which segmental chambers 9, in each half of the cylinder, if we consider the cylinder divided transversely into two parts, are staggered with respect to the segmental chambers or chambers in the other half, the ends of said chambers over-lapping so as to form connected openings 10 between the inner corners of the chambers, thus forming a continuous lubricant chamber which is wholly contained within the space between the two packing rings. The staggered arrangement of the chambers of one series with respect to the chambers of the other series permits the communicating openings 10 to be formed at the corners of the various chambers, and thus each individual chamber is connected by a pair of openings with a pair of the chambers of the opposite series. This construction readily permits the lubricant to pass from one chamber to another regardless of the position of the cylinder. The lubricating medium may be inserted in any desirable manner and is preferably a grease having a creamy consistency which is poured into the axle opening, at one end of the cylinder, which should be upright in this filling operation, the other end thereof being closed temporarily until the chambers are filled. The axle is then inserted trapping the grease in the chambers. The advantage of these communicating chambers will be apparent. No matter in what position the roller may be, the lubricating medium is always in contact with the axle at one or more points, and, should the chambers be only partially filled, the grease will run from one chamber to another and distribute itself over the axle. Another advantage in having the chambers staggered is that it gives a larger bearing surface on the axle and furnishes a solid wall for at least one half the length of the roller at any circumferential point to sustain the load, while permitting the grease direct access from the chambers to the entire load bearing surface of the axle.

What I claim is:

1. A side bearing for railway cars comprising an axle, a support for the axle, a roller mounted on said axle and provided with two series of lubricator chambers, the chambers of one series being staggered with relation to the chambers of the other series, there being a pair of communicating openings between the inner end of each chamber with the inner ends of a pair of chambers of the opposite series, and each of said chambers having communication with the axle bore of the roller.

2. A side bearing for railway cars comprising a base, an axle supported thereby, a supporting roller loosely mounted on the axle and having a plurality of series of segmental lubricator chambers, the chambers of one series being staggered with relation to the chambers of the other series to a pair of the chambers of the other series by a pair of openings at the inner ends of said chambers and there being radially disposed longitudinally extending slots formed in the roller for establishing communication between the axle bore and said chambers.

3. A side bearing for railway cars comprising an axle, a support in which the axle is mounted, and a bearing roller mounted on said axle, said bearing roller being provided with segmental chambers relatively staggered longitudinally of the roller and communicating with one another serially so as to form a continuous irregular cavity about the axle bore of the roller, each of said chambers having communication with the axle bore by a narrow opening extending longitudinally of the roller for a distance approximately one half the bearing extent thereof and all of the narrow openings being staggered with relation to each other.

4. In a device of the class described, a base, a shaft journaled for rotation in said base, and held against lengthwise movement therein, a bearing roller loosely mounted on the shaft and provided with two series of staggered chambers adapted to contain lubricant, each chamber of each series being connected to a pair of the chambers of the opposite series by openings at the inner ends of said chambers, each chamber having communication with the axle bore of the roller by means of longitudinally disposed staggered narrow openings, and internal packing rings carried by said bearing roller near its ends.

In testimony whereof I hereunto affix my signature in the presence of two witnesses, this 27th day of March, 1912.

ERNEST A. LE BEAU.

Witnesses:
EDWARD T. WALKER,
EDWIN F. LEIGH.